(12) United States Patent
Nicolas et al.

(10) Patent No.: US 10,106,429 B2
(45) Date of Patent: Oct. 23, 2018

(54) METHOD OF MAKING ZEOLITES WITH HIERARCHICAL POROSITY

(71) Applicant: ARKEMA FRANCE, Colombes (FR)

(72) Inventors: Serge Nicolas, Lons (FR); Karine Lopez, Arthez de Bearn (FR); Cecile Lutz, Gan (FR); Ludivine Bouvier, Orthez (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 14/889,353

(22) PCT Filed: Aug. 4, 2014

(86) PCT No.: PCT/FR2014/052028
§ 371 (c)(1),
(2) Date: Nov. 5, 2015

(87) PCT Pub. No.: WO2015/019013
PCT Pub. Date: Feb. 12, 2015

(65) Prior Publication Data
US 2016/0137517 A1    May 19, 2016

(30) Foreign Application Priority Data
Aug. 5, 2013 (FR) ...................... 13 57762

(51) Int. Cl.
*C01B 39/02* (2006.01)
*C01B 39/20* (2006.01)
(Continued)

(52) U.S. Cl.
CPC ............ *C01B 39/22* (2013.01); *C01B 39/145* (2013.01); *C01B 39/20* (2013.01); *C01B 39/46* (2013.01);
(Continued)

(58) Field of Classification Search
CPC ..... C01B 39/20; C01B 39/46; C01P 2002/90; C01P 2004/61; C01P 2004/62; C01P 2004/90; C01P 2006/12; C01P 2006/90
(Continued)

(56) References Cited

U.S. PATENT DOCUMENTS

| 3,947,482 A | 3/1976 | Albers |
| 5,098,686 A | 3/1992 | Delprato |

(Continued)

FOREIGN PATENT DOCUMENTS

| CN | 103073020 | 5/2013 |
| CN | 103214003 | 7/2013 |

(Continued)

OTHER PUBLICATIONS

Cho, K., et al., "Generation of mesoporosity in LTA zeolites by organosilane surfactant for rapid molecular transport in catalytic application," Nov. 4, 2009, pp. 5664-5673, vol. 21(23), Chemistry of Materials.

(Continued)

*Primary Examiner* — Hoa (Holly) Le
(74) *Attorney, Agent, or Firm* — RatnerPrestia (57) ABSTRACT

The present invention concerns zeolites with hierarchical porosity having a molar ratio Si/Al of between 1 and 1.4, inclusive, of which the average diameter, as a number, is between 0.1 μm and 20 μm, having controlled and optimized crystallinity, and having mesoporosity such that the mesoporous outer surface area is between 40 $m^2 \cdot g^{-1}$ and 400 $m^2 \cdot g^{-1}$. The present invention also concerns the method for preparing said zeolites with hierarchical porosity.

11 Claims, 3 Drawing Sheets

(51) Int. Cl.
 C01B 39/22 (2006.01)
 C01B 39/46 (2006.01)
 C01B 39/14 (2006.01)
(52) U.S. Cl.
 CPC ...... C01P 2002/72 (2013.01); C01P 2004/04 (2013.01); C01P 2004/61 (2013.01); C01P 2004/62 (2013.01); C01P 2006/12 (2013.01); C01P 2006/14 (2013.01); C01P 2006/17 (2013.01)
(58) Field of Classification Search
 USPC .................................................. 423/716–718
 See application file for complete search history.

(56) References Cited

U.S. PATENT DOCUMENTS

| | | |
|---|---|---|
| 5,928,623 A | 7/1999 | Plee |
| 2013/0183229 A1 | 7/2013 | Garcia-Martinez |

FOREIGN PATENT DOCUMENTS

| | | |
|---|---|---|
| EP | 0364352 | 4/1990 |
| EP | 0818418 | 1/1998 |
| EP | 2592049 | 5/2013 |
| WO | 2007043731 | 4/2007 |
| WO | 2013106816 | 7/2013 |
| WO | 2014090771 | 1/2014 |

OTHER PUBLICATIONS

Breck, D.W., Zeolite Molecular Sieves, John Wiley and Sons, New York, 1973, table 4.26, p. 348.
Feng, Y., et al., "Synthesis of mesoporous LTA zeolites with large BET areas," Jul. 22, 2012, pp. 465-471, vol. 20(3), Journal of Porous Materials.
Inayat, A., et al., "Assemblies of mesoporous FAU-type zeolite nanosheets," Feb. 20, 2012, pp. 1962-1965, vol. 51(8), Angewandte Chemie International Edition.
International Search Report for International Application No. PCT/FR2014/052028 dated Feb. 18, 2015.
Jacobsen, C.J.H., et al., "Mesoporous zeolite single crystals," Jul. 6, 2000, pp. 7116-7117, vol. 122(29), Journal of American Chemical Society.
Liu, B., et al., "Synthesis and structural properties of hierarchically structured aluminosilicates with zeolite Y (FAU) frameworks," Jun. 14, 2013, pp. 15075-15084, vol. 3 (35), RSC Advances.
Matsukata, M., et al., "Conversion of dry gel to microporous crystals in gas phase," 1999, pp. 77-92, vol. 9(1-2), Topics in Catalysis.
Meng, Y., et al., "Synthesis conditions of mesoporous NaA zeolites," Jul. 2013, pp. 4423-4426, vol. 25(8), Asian Journal of Chemistry.
Choi, M., et al., "Amphiphilic organosilane-directed synthesis of crystalline zeolite with tunable mesoporosity," Aug. 6, 2006, pp. 718-723, vol. 5, Nature Materials.
Schwieger, W., et al., "Assemblies of mesoporous FAU-type zeolite nanosheets," Feb. 20, 2012, pp. 1962-1965, vol. 51(8), Angewandte Chemie International Edition.
Serrano, D., et al., "Synthesis strategies in the search for hierarchical zeolites," May 7, 2013, pp. 4004-4035, vol. 42(9), Chemical Society Reviews.
Verboekend, D., et al., "Hierarchical FAU- and LTA-type zeolites by Post-Synthetic Design: A new generation of highly efficient base catalysts," Apr. 19, 2013, pp. 1923-1934, vol. 23(15), Advanced Functional Materials.
Zhang, X., et al., "Synthesis of NaX zeolite: Influence of crystallization time, temperature and batch molar ratio SiO2/Al2O3 on the particulate properties of zeolite crystals," Feb. 2013, pp. 322-328, vol. 235, Powder Technology.
Perez-Ramirez, J., et al., "Hierarchically structured zeolite bodies: assembling micro-, meso-, and macroporosity levels in complex materials with enhanced properties," 2012, pp. 2509-2518, vol. 22 (12), Advanced Functional Materials.
Verboekend, D., et al., "Hierarchical Y and USY zeolites designed by post-synthetic strategies," Mar. 7, 2012, pp. 916-928, vol. 22(5), Advanced Functional Materials.

METHOD OF MAKING ZEOLITES WITH HIERARCHICAL POROSITY

CROSS-REFERENCE TO RELATED APPLICATIONS

This application is the national phase of International application PCT/FR2014/052028, filed Aug. 4, 2014, which claims priority to French application 1357762, filed Aug. 5, 2013. The disclosures of each of these applications are incorporated herein by reference in their entirety for all purposes.

FIELD OF THE INVENTION

The present invention relates to the field of zeolites, more particularly hierarchically porous zeolites, and especially hierarchically porous zeolites with a low Si/Al mole ratio, and most particularly hierarchically porous zeolites with a low Si/Al mole ratio of FAU and LTA structure.

DISCUSSION OF THE RELATED ART

Synthetic (i.e. non-natural) zeolites are of ever-increasing interest in industry, as to witnessed especially by the numerous recent research studies relating to the production of ever more efficient zeolites, with increasingly simple synthetic processes that are economic and easy to perform.

In recent years, hierarchically porous zeolites (HPZ) have been the subject of numerous scientific publications and patent applications. Thus, as early as 2005, the process for synthesizing hierarchically porous zeolites with good crystallinity (pure phase, observed by XRD) was described in patent application WO 2007/043 731, using a structuring agent of organosilane type.

The product obtained after calcination comprises a zeolite network linked to a network of mesopores a few manometers in diameter. The hydrothermal resistance of this product is much better than that of mesoporous solids of MCM-41 type, which makes it possible to envisage applications in which thermal regeneration takes place.

Other methods for preparing hierarchically porous zeolites, i.e. solids comprising a microporous network of zeolite type linked to a network of mesopores, have been developed and may be classified in the following manner (review by D. P. Serrano, Chem. Soc. Rev., (2013), 42, 4004-4035):

Post-treatment of zeolite structure which consists in removing atoms from the zeolite network to create mesopores; this may take place either via acidic treatments which dealuminize the solid, followed by washing with sodium hydroxide which removes the aluminium residues formed (J. Pérez-Ramírez et al., Adv. Funct. Mater., (2012), 1-12) or via treatments that combine the action of an acid and that of a structuring agent which promotes the formation of mesopores (cf. WO 2013/106816).

"Hard templating method" or "moulding method" which consists in using a porous network (organic or inorganic) as a mould; this porous network is placed in contact with a reaction medium that can form a zeolite network via hydrothermal transformation, crystallization of the zeolite is performed and the mould is then removed either by calcination or by dissolution to generate the mesoporosity (C. J. H. Jacobsen, J. Am. Chem. Soc., (2000), 122, 7116-7117).

Zeolitization of amorphous mesoporous solids such as mesoporous silicas formed according to the sol-gel technique described by M. Matsukata et al., (Top. Catal., (1999), 9, 77-92).

Direct synthesis mentioned at the start using a structuring agent of organosilane type, this type of structuring agent having the particular feature of having, on the one hand, affinity with the silico-alumina species which form the zeolite network by virtue of its silane function, and, on the other hand, of being able to occupy a space with its long-chain organic function which serves to occupy the space and to create mesoporosity when it is removed (patent application WO 2007/043 731).

However, even though the solids obtained according to this direct synthetic process do indeed have hierarchical porosity as shown by the nitrogen adsorption isotherms and the transmission microscopy photos (A. Inayat et al., Angew. Chem. Int. Ed., (2012), 51, 1962-1965), it is observed that:

the micropore volume of these hierarchically porous zeolites is significantly lower than that of non-mesoporous zeolites, the structuring agent modifies the growth rates of the crystal faces, which does not allow the size of the crystals to be correctly controlled, the increase in content of structuring agent directed towards increasing the mesopore volume leads to a loss of selectivity for the crystallization of a given zeolite, which results in the formation of an unwanted mixture of zeolite structures (Y. Meng at al., Asian Journal of Chemistry, 25 (8), (2013), 4423-4426).

One of the objects of the present invention is to solve at least these three major drawbacks noted for direct synthesis using a structuring agent of organosilane type.

Mention may also be made of the following documents, in which the use of structuring agents of organosilane type, and of organosilane derivatives, is described, for the purpose of synthesizing various hierarchically porous zeolite structures including zeolites X and LTA.

Thus, R. Ryoo (Nature Materials, (2006), vol. 5, p. 718 sqq.) describes the synthesis of LTA having mesoporosity and, later, (K. Cho et al., Chem. Mater., 21, (2009), 5664-5673) the synthesis of mesoporous zeolites of LTA type and applications thereof in catalysis. The diffractograms presented in FIG. 2 of the article by K. Cho (see above) show that there is no contaminating crystalline phase. On the other hand, the decrease in intensity of the peaks, when there is addition of structuring agent and a fortiori when its amount increases, proves a degradation of the crystalline framework (low microporosity).

Patent application EP2592049 proposes the synthesis of a zeolite having very substantial and well-organized mesoporosity, but with a marked degradation of the crystalline framework (very low microporosity). This process uses a specific structuring agent comprising three ammonium functions.

The studies by W. Schwieger (Angew. Chem., Int. Ed., (2012), 51, 1962-1965) concern the synthesis of mesoporous zeolite of FAU (X) type using a structuring agent. A single example presents the use of TPHAC ([3-(trimethoxysilyl)propyl]hexadecyldimethylammonium chloride) as structuring agent, with a TPHAC/$Al_2O_3$ mole ratio equal to 0.06. The zeolite obtained in this example has a micropore volume of 0.26 $cm^3 \cdot g^{-1}$ and an outer surface area of 130 $m^2 \cdot g^{-1}$. The content of structuring agent described (0.06) is in fact a maximum upper limit. Specifically, a content higher than this value leads to the appearance of zeolite of type P, even when the crystallization is performed at low temperature. It therefore does not appear possible to increase the mesoporous surface area beyond 130 m²·g⁻¹ while at the same time conserving a pure zeolite structure, without contamination with zeolite of type P.

The article by Y. Meng (*Asian Journal of Chemistry*, 25 (8), (2013), 4423-4426) describes syntheses of mesoporous zeolite LTA using [3-(trimethoxysilyl)propyl]octadecyldimethylammonium chloride (TPOAC), as structuring agent, and presents a study of various synthetic parameters, including the amount of structuring agent used, the alkalinity of the reaction medium and the crystallization temperature.

It emerges that an increase in the content of structuring agent which should lead to an increase in the mesopore volume also has the effect of modifying the growth rates of the zeolite network, thus resulting in the appearance of other zeolite crystalline phases and thus the formation of mixtures of zeolite structures, which is not desired. Moreover, the diffractograms of FIG. 1 of the said article show a lowering of the crystallinity.

The abovementioned prior art moreover shows that the micropore volumes are markedly lower than the micropore volumes of equivalent non-mesoporous zeolites (i.e. zeolites whose mesoporous outer surface area as defined below is strictly less than 40 m²·g⁻¹), which is very detrimental in applications in which a high content of active sites is required. What is more, the size of the crystals is subject and cannot be modified.

Finally, the preparation processes described in the prior art do not appear to be readily industrializable especially on account of the high costs that they may generate, and on account of the synthesis times, which are proportionately longer the higher the desired mesoporosity.

The main references for post-treatments are discussed below. Document US 2013/0 183 229 introduces an amount of Pluronic® of the same order of magnitude as the amount of zeolite X, and performs long, liquid-route treatments followed by several calcination treatments, whereas document WO 2013/106 816 introduces treatments with a cetyltrimethylammonium (CTA) halide coupled with an acid. The publication by J. Pérez-Ramírez et al. (ibid.) describes post-treatments that are optimized for zeolites X and LTA with, first, a treatment with the acid $H_4EDTA$ followed by an NaOH basic treatment and finally a further treatment with acidic $Na_2H_2EDTA$.

Although these processes make it possible to prepare hierarchically porous zeolites, as shown by the shape of the nitrogen adsorption isotherms of the solids obtained, it is important to note that these processes use amounts of complexing agent of the same order of magnitude as the initial mass of zeolite with numerous long operations. Furthermore, the mass yield of these processes is less than 60%, which further penalizes their production efficiency. These processes are therefore long, expensive and relatively unproductive. Furthermore, the micropore volumes are greatly reduced by the various treatments.

SUMMARY OF THE INVENTION

The inventors have now discovered that the problems encountered in the prior art can be totally or at least partially solved by means of the hierarchically porous zeolites according to the present invention.

In particular, one aim of the present invention consists in providing hierarchically porous zeolites combining a high micropore volume, optimal purities and adjustable crystal sizes. Another aim of the present invention consists in providing a process that is economical, simple and readily industrializable for the preparation of the said zeolites.

Thus, and according to a first aspect, the present invention relates to a hierarchically porous zeolite having at least the following characteristics:

Si/Al mole ratio of between 1 and 1.4, limits inclusive,
a numerical mean diameter of the crystals of between 0.1 µm and 20 µm, preferably between 0.1 µm and 10 µm, more preferably between 0.5 µm and 10 µm, and more preferentially between 0.5 µm and 5 µm, limits inclusive,
controlled and optimal crystallinity, and
mesoporosity such that the mesoporous outer surface area is between 40 m²·g⁻¹ and 400 m²·g⁻¹, and preferably between 60 m²·g⁻¹ and 200 m²·g⁻¹.

DESCRIPTION OF THE DRAWINGS

FIGS. 1*a* and 1*b* are TEM images of a reference zeolite (FIG. 1*a*) and of the zeolite prepared in accordance with Example 1, while

DETAILED DESCRIPTION OF CERTAIN EMBODIMENTS OF THE INVENTION

According to a preferred embodiment, the zeolite according to the present invention is a zeolite of FAU type, and especially a zeolite X, MSX, LSX or a zeolite of EMT type or alternatively a zeolite of LTA type, i.e. a zeolite A. The term "zeolite MSX" (Medium Silica X) means a zeolite of FAU type having an Si/Al atomic ratio of between about 1.05 and about 1.15, limits inclusive. The term "zeolite LSX" (Low Silica X), means a zeolite of FAU type having an Si/Al atomic ratio equal to about 1.

The characteristics mentioned above give the zeolite according to the present invention improved and entirely surprising and advantageous properties, when compared with the solely microporous zeolites or zeolites that are both microporous and mesoporous known in the prior art.

The crystal size of the zeolite according to the present invention is expressed via the numerical mean diameter of the crystals by observation using a scanning electron microscope (SEM), as indicated hereinbelow. The present invention also has the advantage of making it possible to adjust and control this crystal size, especially as a function of the synthetic conditions detailed below.

The term "zeolite of controlled and optimal crystallinity" means, on the one hand, a zeolite comprising a pure zeolite phase, and more specifically consisting of a single zeolite phase or comprising, preferably consisting of, up to 2% by weight, limit inclusive, of only one or of several other zeolite or amorphous phases, known as contaminating phases (crystallinity determined by XRD, technique described below), and, on the other hand, a micropore volume Vµp which satisfies the equation $V\mu p = V\mu p_R \pm 15\%$, preferably the equation $V\mu p = V\mu p_R \pm 10\%$, and more preferentially the equation $V\mu p = V\mu p_R \pm 5\%$, where $V\mu p_R$ represents the micropore volume measured under the same conditions, for a zeolite of the same chemical nature and of the same crystalline structure, which is perfectly crystalline (according to the base ICDD PDF-2, release 2011) but non-mesoporous within the meaning of the invention, i.e. whose outer surface area is strictly less than 40 m²·g⁻¹.

For example, according to *Zeolite Molecular Sieves* by D. W. Breck, John Wiley & Sons, New York, (1973), table 4.26, p. 348, the micropore volume $V\mu p_R$ of a perfectly crystalline non-mesoporous zeolite LTA is equal to 0.30 cm$^3 \cdot$g$^{-1}$, and in the same publication and the same table 4.26, p. 351, the micropore volume $V\mu p_R$ of a zeolite FAU NaX, with an Si/Al ratio of between 1 and 1.5, which is non-mesoporous and perfectly crystalline, is equal to 0.36 cm$^3 \cdot$g$^{-1}$.

The micropore volume calculation is performed by applying the methods known to those skilled in the art from the nitrogen or argon adsorption isotherm by applying, as indicated later, the Dubinin-Raduskevitch equation. As a reminder, the calculation of the mesopore outer surface area is measured using the Harkins-Jura equation.

The hierarchically porous zeolites according to the invention are solids comprising a microporous network linked to a network of mesopores, and thus making it possible to reconcile the properties of accessibility to the mesoporous zeolite active sites known in the prior art and those of maximum crystallinity and microporosity of "standard" zeolites (without mesoporosity). Thus, the hierarchically porous zeolites of the present invention have unexpected properties and open new perspectives as regards their fields of industrial application.

In addition, the zeolites of the present invention may be subjected to one or more cationic exchanges (for example with alkali metal or alkaline-earth metal salt(s)) as is well known to those skilled in the art and commonly performed on conventional zeolites.

According to another aspect, the present invention relates to the process for preparing the hierarchically porous zeolites as have just been described. The process of the invention especially has the advantages of being performed easily, of being readily transposable to the industrial scale, especially on account of the high synthetic material yields, the robustness of the process and its rapidity.

More precisely, the process for preparing the hierarchically porous zeolite according to the invention comprises at least the following steps:

a) preparation of a "growth" gel, by mixing a source of silica with a source of alumina, at a temperature of between 0° C. and 60° C.,
b) addition to the growth gel of step a) of a nucleating agent, at a temperature of between 0° C. and 60° C.,
c) addition to the reaction medium of at least one structuring agent,
d) crystallization reaction by increasing the temperature,
e) filtration and washing of the zeolite crystals obtained, and
f) drying and calcination.

It should be understood that step c) of addition of structuring agent(s) may be performed at the same time as steps a) and/or b) or alternatively before and/or after steps a) and/or b). In all cases, the structuring agent should be present in the reaction medium before the crystallization step d). However, it is preferred to add the structuring agent after step b). In addition, a lag time (resting time, with or without stirring) may be envisaged between steps a), b), c) and d).

According to a preferred aspect, the growth gel comprises a homogeneous mixture of a source of silica (for example sodium silicate), a source of alumina (for example alumina trihydrate), a strong mineral base, for instance sodium, potassium or calcium hydroxide, to mention but the main ones and the ones most commonly used, and water.

The process of the present invention is characterized by the use of the technique of seeding with at least one nucleating agent, which is well known to those skilled in the art, chosen, for example, from a nucleating gel, a crystal, for example a zeolite crystal, a mineral particle of any nature, for example kaolin, meta-kaolin, or another clay, and the like, and also mixtures thereof.

Without wishing to be bound by the theory, it is considered that the nucleating agent promotes the orientation of the synthesis towards the desired zeolite. In addition, and by virtue of the presence of the nucleating agent, it is possible to use a larger amount of structuring agent than that described in the prior art without disrupting or slowing down the crystallization of the zeolite network.

According to a preferred aspect, the nucleating agent is a nucleating gel and, more preferably, the said nucleating gel comprises a homogeneous mixture of a source of silica (for example sodium silicate), a source of alumina (for example alumina trihydrate), a strong mineral base, for instance sodium hydroxide, potassium hydroxide or calcium hydroxide, to mention but the main ones and the ones most commonly used, and water.

The homogeneity of the mixture may be obtained according to any process that is well known to those skilled in the art and, for example and in a non-limiting manner, using a paddle stirrer, a mixer, or alternatively using a mixer of Archimedean screw type as described in patent EP 0 818 418.

By way of non-limiting example, in a three liter reactor, with an Archimedean screw whose rotation is set at 300 rpm, satisfactory homogeneity is obtained between a few minutes and a few tens of minutes, generally between 20 minutes and 30 minutes.

The mixture is generally prepared at temperatures of between 0° C. and 60° C., and preferably between 10° C. and 40° C., and, for practical and economic reasons, the mixture is more preferably prepared at room temperature, for example at 25° C. The homogenization period is then generally less than two hours.

The process of the present invention is also characterized by the addition to the growth gel thus obtained of a nucleating agent, and preferably of a nucleating gel according to the concept defined in U.S. Pat. No. 3,947,482. The amount of nucleating agent added may vary within wide proportions, and the amount of nucleating gel added may generally be between 0.1% and 20%, preferably between 0.5% and 15% by weight and more preferably between 1% and 10% by weight, limits inclusive, relative to the weight of the growth gel.

When the nucleating agent is a zeolite crystal, it is preferably a zeolite crystal of the same nature as the zeolite that it is desired to synthesize. The size of the crystal may vary within wide proportions, and is, for example, typically between 0.1 μm and 10 μm. According to a preferred embodiment, the zeolite crystal is introduced in the form of an aqueous suspension. The amount of crystals introduced may also vary within wide proportions and is generally typically between 0.1% and 10% by weight relative to the total weight of growth gel.

As indicated previously, the process of the present invention is a process for the direct synthesis of hierarchically porous zeolite, and not a process in which the hierarchic porosity results from a post-treatment of an already-synthesized zeolite. However, it would not constitute a departure from the context of the invention to perform a subsequent step of post-treatment of the zeolite as synthesized.

Thus, the process of the present invention comprises a step of addition to the mixture [growth gel/nucleating agent] obtained in step b) of at least one structuring agent.

The structuring agents that may be used are of any type known to those skilled in the art and especially those described in patent application WO 2007/043 731. According to a preferred embodiment, the structuring agent is advantageously chosen from organosilanes and more preferentially from [3-(trimethoxysilyl)propyl]octadecyldimethylammonium chloride, [3-(trimethoxysilyl)propyl]hexadecyldimethylammonium chloride, [3-(trimethoxysilyl)propyl]dodecyldimethylammonium chloride, [3-(trimethoxysilyl)propyl]octylammonium chloride, N-[3-(trimethoxysilyl)propyl]aniline, 3-[2-(2-aminoethylamino)ethylamino]propyltrimethoxysilane, N-[3-(trimethoxysilyl)propyl]-N'-(4-vinylbenzyl)ethylenediamine, triethoxy-3-(2-imidazolin-1-yl)propylsilane, 1-[3-(trimethoxysilyl)propyl] urea, N-[3-(trimethoxysilyl)propyl]ethylenediamine, [3-(diethylamino)propyl]trimethoxysilane, (3-glycidyloxypropyl)trimethoxysilane, 3-(trimethoxysilyl) propyl methacrylate, [2-(cyclohexenyl)ethyl]triethoxysilane, dodecyltriethoxysilane, hexadecyltrimethoxysilane, (3-aminopropyl)trimethoxysilane, (3-mercaptopropyl) trimethoxysilane, (3-chloropropyl)trimethoxysilane, and also mixtures of two or more thereof in all proportions.

Among the structuring agents listed above, [3-(trimethoxysilyl)propyl]octadecyldimethylammonium chloride, or TPOAC, is most particularly preferred.

Use may also be made of structuring agents of higher molar mass, for example PPDAs (polymer poly-diallyldimethylammonium), PVB (polyvinyl butyral) and other oligomeric compounds known in the field for increasing the diameter of mesopores.

The amount of structuring agent(s) may vary within wide proportions and in general it is such that the structuring agent(s)/starting $Al_2O_3$ mole ratio is between 0.005 and 0.20, preferably between 0.01 and 0.15, and more preferably between 0.02 and 0.08, limits inclusive.

The addition of the structuring agent(s) is performed with stirring, for example as indicated previously in step a), and the mixture is then subjected to a maturation step, preferentially with stirring, still at the same temperature, for example at 25° C., for a time ranging from a few minutes to several tens of minutes, typically for one hour, with stirring at 300 rpm.

After this maturation step, the reaction mixture is engaged in the crystallization step d), with continued stirring, but slower, typically between 20 rpm and 100 rpm, for example at 50 rpm, and while increasing the temperature up to a value between 60° C. and 100° C., for example 75° C. The time required for the crystallization is generally between a few hours and several tens of hours, advantageously between 8 hours and 48 hours.

After the crystallization step, the zeolite crystals are extracted from the reaction medium by filtration, and then washed with one or more suitable aqueous and/or organic solvent(s), but preferably aqueous, and finally dried between 50° C. and 150° C., according to the usual techniques known to those skilled in the art.

The mean size of the crystals may especially be controlled by adjusting the content of nucleating agent (nucleating gel, or crystals, for example of zeolite, or the like) relative to the growth gel in step b).

The dried crystals are then subjected to calcination, this step being necessary to release both the microporosity (removal of water) and the mesoporosity (removal of the structuring agent). The calcination performed to remove the structuring agent may be performed according to any calcination method known to those skilled in the art. For example, and in a non-limiting manner, the calcination of the zeolite crystals comprising the structuring agent may be performed under a stream of an oxidizing and/or inert gas, especially with gases such as oxygen, nitrogen, air, a dry and/or decarbonated air, an oxygen-depleted air, which is optionally dry and/or decarbonated, at one or more temperatures above 150° C., typically between 180° C. and 800° C., and preferentially between 200° C. and 650° C., for a few hours, for example between 2 and 6 hours. The nature of the gases, the temperature increase ramps and the successive temperature steady stages and the durations thereof will be adapted as a function of the nature of the structuring agent.

It would not constitute a departure from the context of the invention to perform one or more cationic exchanges (for example with alkali metal or alkaline-earth metal salt(s)), before or after the drying and/or calcination step (step f)), according to the standard cationic exchange techniques.

As indicated previously, the synthetic process of the invention is performed easily and is performed in a relatively short time, and especially in a time reduced by a factor of at least four, relative to the HPZ synthetic processes known in the prior art, which are very long, for example on account of the inhibiting effect of the organosilane structuring agent for the nucleation and the growth of the microporous zeolite network. It has been discovered, entirely surprisingly, that the inhibiting effect of the structuring agent (for example TPOAC) is compensated for by virtue of the presence of the nucleating agent.

This simplicity and this speed of synthesis do not, however, harm the quality or properties of the zeolites thus obtained. Specifically, by virtue of the process of the invention, it is possible to increase the selectivity of the synthesis towards a pure zeolite structure (with less than 2% by weight of other contaminating crystalline phase(s)) and to be able to maximize the [micropore volume/mesopore outer surface area] ratio for a given outer surface area, which is not the case with the known processes of the prior art (cf. for example, the studies by Y. Meng (ibid.) from which it emerges that an increase in the content of structuring agent, which should lead to an increase in the mesopore volume, also had the effect of modifying the rates of growth of the zeolite network, thus resulting in the appearance of other zeolite crystal phases and thus the formation of mixtures of zeolite structures, which is not desired).

Specifically, with the processes of the prior art, increasing the micropore volume of the zeolite and maintaining a high phase purity are only obtained by means of very long crystallization times and relatively low temperatures (<80° C.). However, these processes never achieve micropore volumes comparable to those of the invention.

Thus, when compared with the other HPZ preparation processes, for example by post-treatment, the process of the invention is more productive and less expensive, since it is performed in a single step, over a relatively short time (less than one day) with a small amount of structuring agent, and thus globally with a relatively low cost, or at the very least with a limited excess cost when compared with that of a synthesis of non-mesoporous zeolite, and very much lower than the cost induced by processes of HPZ synthesis via post-treatment.

The use of these hierarchically porous zeolites is particularly advantageous in industrial processes such as adsorption, ion exchange, separation, and may also be envisaged in any technical field in which non-mesoporous zeolites are usually used.

The present invention is now illustrated by the examples that follow and which are presented without any intention to limit the various embodiments of the invention.

In the examples that follow, the physical properties of the zeolite crystals are evaluated via the methods known to those skilled in the art, the main ones of which are recalled below.

Loss on Ignition of the Zeolite Crystals

The loss on ignition is determined under an oxidizing atmosphere, by calcination of the sample in air at a temperature of 950° C.±25° C., as described in standard NF EN 196-2 (April 2006). The measurement standard deviation is less than 0.1%.

Dubinin-Raduskevitch Volume:

The Dubinin-Raduskevitch volume is determined from the measurement of the isotherm of adsorption of a gas, such as nitrogen or argon, at its liquefaction temperature, as a function of the pore aperture of the zeolite structure: argon or nitrogen will be chosen for LTA (exchanged beforehand with calcium, as described in Breck, ibid., table 5.7 page 428) and nitrogen will be chosen for FAU. Prior to the adsorption, the zeolite adsorbent is degassed at between 300° C. and 450° C. for a time of between 9 hours and 16 hours, under vacuum ($P<6.7\times10^{-4}$ Pa). The measurement of the adsorption isotherms is then performed on a machine of ASAP 2020 type from Micromeritics, taking at least 35 measurement points at P/P0 relative ratio pressures of between 0.002 and 1. The micropore volume is determined according to Dubinin-Raduskevitch from the isotherm obtained, by applying standard ISO 15901-3 (2007). The micropore volume evaluated according to the Dubinin-Raduskevitch equation is expressed in $cm^3$ of liquid adsorbent per gram of zeolite. The measurement uncertainty is $\pm 0.003$ $cm^3 \cdot g^{-1}$.

Size and Morphology of the Crystals (SEM)

The estimation of the numerical mean diameter of the zeolite crystals is performed as indicated previously by observation with a scanning electron microscope.

In order to estimate the size of the zeolite crystals on the samples, a set of images is taken at a magnification of at least 5000. The diameter of at least 200 crystals is then measured using devoted software, for example the Smile View software from the publisher LoGraMi. The accuracy is of the order of 3%.

The morphology of the crystals is qualified from SEM photogrHPAs taken at the magnification suited to the size of the crystals.

Measurement of the Mesopore Outer Surface Area ($m^2 \cdot g^{-1}$) Via the T-plot Method:

The t-plot calculation method exploits the data of the adsorption isotherm Q ads=f (P/P0) and makes it possible to calculate the micropore surface area. The mesopore outer surface area may be deduced therefrom by determining the difference with the BET surface area which measures the total pore surface area in $m^2 \cdot g^{-1}$ (BET S=microp. S+mesop. outer S).

To calculate the micropore surface area via the t-plot method, the curve Q ads ($cm^3 \cdot g^{-1}$) is plotted as a function of t=thickness of the layer dependent on the partial pressure P/P0 which would be formed on a reference non-porous solid (t function of log P/P0: Harkins-Jura equation applied (standard ISO 15901-3:2007)):

$$[13.99/(0.034-\log(P/P0))^{0.5}],$$

in which, in the interval t between 0.35 nm and 0.5 nm, a straight line may be plotted which defines a y-axis at the origin Q adsorbed which makes it possible to calculate the micropore surface area; if the solid is not microporous, the straight line passes through 0.

Observation of the Mesopore Structure by Transmission Electron Microscopy

The powder is dispersed in ethanol: 1 minute with ultrasonication. One drop of the solution is placed on a microscope grate. The sample is left to dry under the ambient conditions. The observation is performed with a transmission electron microscope (CM 200 from FEI) at a voltage of 120 kV.

The magnifications obtained of ×220 000 (cf. FIG. 1b) make it possible to visualize the presence of the mesopores and to estimate their diameters.

Analysis of the Si/Al Atomic Ratio of the Zeolites by X-ray Fluorescence

An elemental chemical analysis of the hierarchically porous zeolite may be performed according to various analytical techniques known to those skilled in the art. Among these techniques, mention may be made of the technique of chemical analysis by X-ray fluorescence as described in standard NF EN ISO 12677:2011 on a wavelength dispersive spectrometer (WDXRF), for example the Tiger S8 machine from the company Bruker.

X-ray fluorescence is a non-destructive spectral technique exploiting the photoluminescence of atoms in the X-ray range, to establish the elemental composition of a sample. The excitation of the atoms, generally with an X-ray beam or by electron bombardment, generates specific radiations after returning to the ground state of the atom. The X-ray fluorescence spectrum has the advantage of being sparingly dependent on the chemical combination of the element, which offers precise determination, both quantitatively and qualitatively. After calibration for each oxide, a measurement uncertainty of less than 0.4% by weight is conventionally obtained.

These elemental chemical analyses make it possible to check the Si/Al atomic ratio of the zeolite, the measurement uncertainty of the Si/Al atomic ratio is ±5%.

Qualitative and Quantitative Analyses by X-ray Diffraction

This analysis makes it possible to identify the crystal phases present in the analyzed solid since each of the zeolite structures has a unique diffractogram (or diffraction spectrum) defined by the position of the diffraction peaks and by their relative intensities.

The zeolite crystals are spread out and smoothed on a sample holder by simple mechanical compression. The acquisition conditions for the diffractogram performed on the D5000 Brüker machine are as follows:

Cu tube used at 40 kV-30 mA;

slit size (divergent, scattering and analysis)=0.6 mm;

filter: Ni;

rotating sample device: 15 rpm;

measurement range: $3°<2\theta<50$;

increment: 0.02°;

counting time per increment: 2 seconds.

The interpretation of the diffraction spectrum (or diffractogram) obtained is performed with the EVA software with identification of the phases using the base ICDD PDF-2, release 2011, which makes it possible to demonstrate a perfectly crystalline phase.

The quantity of the zeolite X fractions is measured by XRD analysis. This analysis is performed on a Brüker machine, and the quantity of zeolite X fractions is then evaluated by means of the TOPAS software from the company Brüker.

EXAMPLE 1

Synthesis of HPX with Addition of Nucleating Gel and Growth Gel with a TPOAC/Al$_2$O$_3$ Ratio=0.04

(Where HPX Designates a Hierarchically Porous Zeolite (HP2) of Type X)

a) Preparation of the Growth Gel in a Reactor Stirred with an Archimedean Screw at 300 rpm.

A growth gel is prepared in a three liter stainless-steel reactor equipped with a heating jacket, a temperature probe and a stirrer, by mixing a solution of aluminate containing 119 g of sodium hydroxide (NaOH), 128 g of alumina trihydrate (Al$_2$O$_3$.3H$_2$O, containing 65.2% by weight of Al$_2$O$_3$) and 195.5 g of water at 25° C. for 25 minutes with a stirring speed of 300 rpm in a silicate solution containing 565.3 g of sodium silicate, 55.3 g of NaOH and 1997.5 g of water at 25° C.

The stoichiometry of the growth gel is as follows: 3.48 Na$_2$O/Al$_2$O$_3$/3.07 SiO$_2$/180 H$_2$O. The homogenization of the growth gel is performed with stirring at 300 rpm, for 25 minutes, at 25° C.

b) Addition of the Nucleating Gel 61.2 g of nucleating gel (i.e. 2% by weight) of composition 12 Na$_2$O/Al$_2$O$_3$/10SiO$_2$/180 H$_2$O prepared in the same manner as the growth gel, and having been matured for one hour at 40° C., is added to the growth gel, at 25° C. with stirring at 300 rpm. After 5 minutes of homogenization at 300 rpm, the stirring speed is reduced to 100 rpm and stirring is continued for 30 minutes.

c) Introduction of the Structuring Agent into the Reaction Medium 27.3 g of a solution of TPOAC at 60% in methanol (MeOH) is introduced into the reaction medium with a stirring speed of 300 rpm (TPOAC/Al$_2$O$_3$ mole ratio=0.04). A maturation step is performed at 25° C. for one hour at 300 rpm before starting the crystallization.

d) Crystallization

The stirring speed is lowered to 50 rpm and the nominal temperature of the reactor jacket is set at 80° C. in order for the temperature of the reaction medium to rise to 75° C. over 80 minutes. After 22 hours at a steady stage of 75° C., the reaction medium is cooled by circulating cold water in the jacket to stop the crystallization.

e) Filtration/Washing

The solids are recovered on a sinter and then washed with deionized water to neutral pH.

f) Drying/Calcination

In order to characterize the product, drying is performed in an oven at 90° C. for 8 hours, the loss on ignition of the dried product being 23% by weight.

The calcination of the dried product required to release both the microporosity (water) and the mesoporosity by removing the structuring agent is performed with the following temperature profile: 30 minutes of temperature increase to 200° C., then 1 hour at a steady stage of 200° C., then 3 hours of temperature increase to 550° C., and finally 1.5 hours of steady stage at 550° C.

255 g of anhydrous zeolite HPX equivalent solid are thus obtained; which represents a yield of 99 mol % relative to the amount of aluminium engaged. The Si/Al ratio of the HPZ determined by X-ray fluorescence is equal to 1.24.

EXAMPLE 2

Synthesis of HPX with Addition of Nucleating Gel and Growth Gel with a TPOAC/Al$_2$O$_3$ Ratio=0.02

The process is performed as in Example 1, with a TPOAC/Al$_2$O$_3$ mole ratio of 0.02. 255 g of anhydrous zeolite HPX equivalent solid are obtained, which represents a yield of 99 mol % relative to the amount of aluminium engaged. The Si/Al ratio of the HPZ determined by X-ray fluorescence is equal to 1.24.

EXAMPLE n° 3

Synthesis of HPX with Addition of Nucleating Gel and Growth Gel with a TPOAC/Al$_2$O$_3$ Ratio=0.08

The process is performed as described in Example 1, with a TPOAC/Al$_2$O$_3$ mole ratio of 0.08. 255 g of anhydrous zeolite HPX equivalent solid are obtained, which represents a yield of 99 mol % relative to the amount of aluminium engaged. The Si/Al ratio of the HPZ determined by X-ray fluorescence is equal to 1.24.

EXAMPLE n° 4

Synthesis of HPX with Addition of Zeolite Crystals and Growth Gel with a TPOAC/Al$_2$O$_3$ Ratio=0.04

The process is performed as described in Example 1, with a TPOAC/Al$_2$O$_3$ mole ratio of 0.04, and in which, in step b), the nucleating gel is replaced by the introduction of 1% by weight (relative to the total weight of the growth gel) of zeolite X crystals (crystals with a volume-mean diameter of about 0.8 µm, prepared as described in synthesis example b) of patent application WO 2014/090 771). 254 g of a solid having the same characteristics as those obtained for the solid of Example 1 are obtained.

Comparison of the Characteristics of the Hierarchically Porous Zeolite X Powders Synthesized in Examples 1, 2 and 3

The results of the characterizations of the hierarchically porous zeolites are collated in Table 1 with a comparison with a reference zeolite X, Siliporite® G5 AP, sold by the company CECA, and for which the mean size of the crystals is 1.5 µm.

The porosity characteristics (micropore volume, mesopore outer surface area, mesopore size distribution) are calculated from the nitrogen adsorption/desorption isotherms at the temperature of liquid nitrogen for a powder degassed beforehand at 300° C. under vacuum. The measurements are taken on an ASAP 2020 machine from Micromeritics.

The micropore volume (cm$^3$·g$^{-1}$) is calculated according to the Dubinin-Raduskevich theory. The mesopore outer surface area (m$^2$·g$^{-1}$) is calculated using the t-plot model. The mesopore size distribution is calculated via the Density Functional Theory (DFT) method with the cylindrical pore model.

X-ray diffraction makes it possible to identify the crystal phases present in the powder from the reference spectra (or diffractograms) of the various zeolite structures and to demonstrate the level of crystallinity of the solids produced as a function of the peak intensity.

Figure 1A:
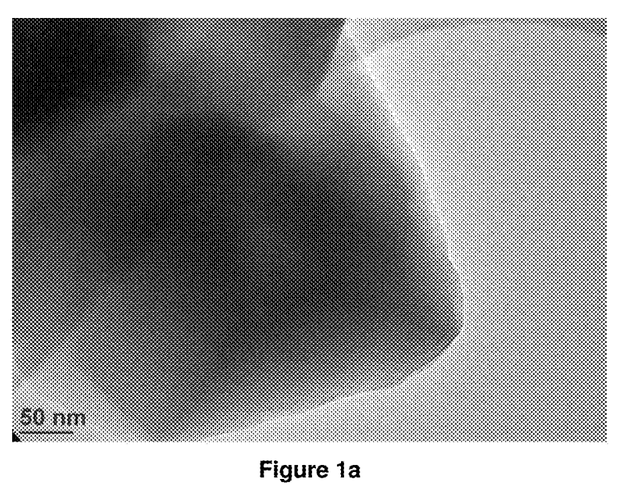
Figure 1B:
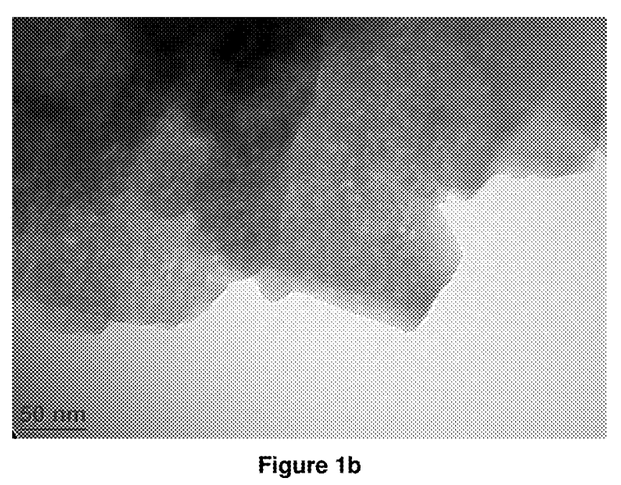
Figure 2:
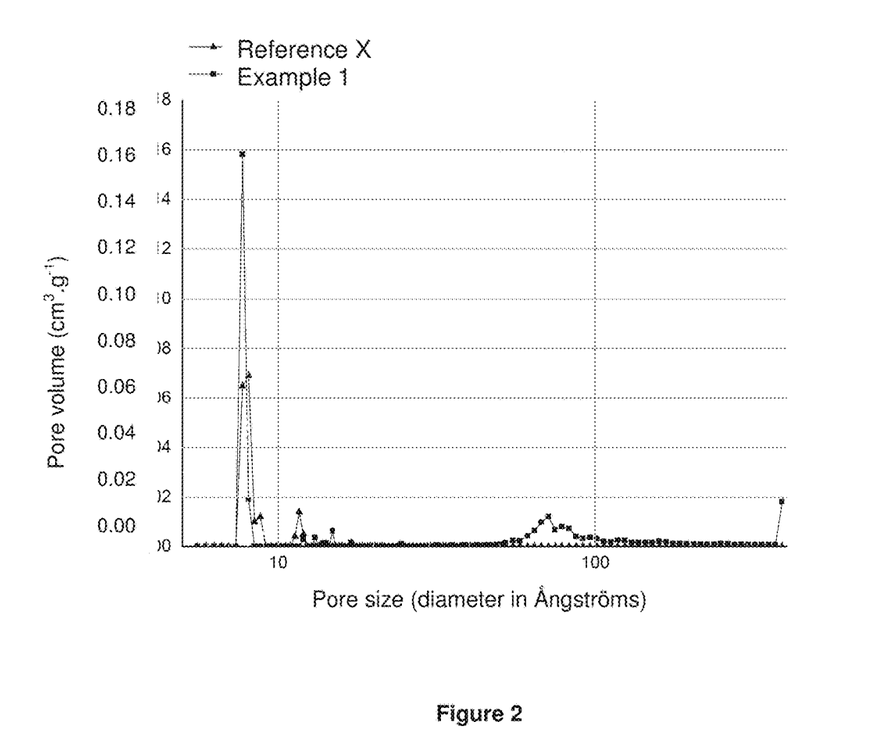
FIG. 2 shows their pore volume as a function of pore size.

FIGS. 1a and 1b are TEM images of the reference zeolite (FIG. 1a) and of the zeolite according to the invention of Example 1 (FIG. 1b) and FIG. 2 shows their pore volume (volume in the micropores and volume in the mesopores) as a function of the pore size. The pore volume is determined as indicated above (measurement using the nitrogen adsorption isotherm as described in the "Dubinin-Raduskevitch volume" technique above).

COMPARATIVE EXAMPLE 1

Synthesis of Zeolite Crystals without Addition of Nucleating Gel, and with TPOAC/Al$_2$O$_3$=0.04

1) Preparation of the Growth Gel in a Reactor Stirred with an Archimedean Screw at 300 rpm A growth gel is prepared in a 3 liter stainless-steel reactor equipped with a heating jacket, a temperature probe and a stirrer, by mixing an aluminate solution containing 119 g of sodium hydroxide (NaOH), 128 g of alumina trihydrate (Al$_2$O$_3$.3H$_2$O, containing 65.2% by weight of Al$_2$O$_3$) and 195.5 g of water at 25° C. over 25 minutes with a stirring speed of 300 rpm in a silicate solution containing 565.3 g of sodium silicate, 55.3 g of NaOH and 1997.5 g of water at 25° C.

The stoichiometry of the growth gel is as follows: 3.48 Na$_2$O/Al$_2$O$_3$/3.07 SiO$_2$/180 H$_2$O. The homogenization of the growth gel is performed with stirring at 300 rpm for 25 minutes at 25° C.

2) Introduction of the Structuring Agent into the Reaction Medium 27.3 g of a solution of TPOAC at 60% in MeOH is introduced into the reaction medium with a stirring speed of 300 rpm (TPOAC/Al$_2$O$_3$ mole ratio=0.04). After 5 minutes of homogenization, the stirring speed is lowered to 50 rpm.

3) Maturation Phase

The reaction medium is kept stirring at 50 rpm at 25° C. for 22 hours, and crystallization is then started.

4) Crystallization

The stirring speed is maintained at 50 rpm, and the nominal temperature of the reactor jacket is set at 80° C. so that the temperature of the reaction medium rises to 75° C. over 80 minutes. After 72 hours at a steady stage of 75° C., the reaction medium is cooled by circulating cold water in the jacket to stop the crystallization.

5) Filtration/Washing

The solids are recovered on a sinter and then washed with deionized water to neutral pH.

6) Drying/Calcination

In order to characterize the product, drying is performed in an oven at 90° C. for 8 hours, the loss on ignition of the dried product being 22% by weight.

The calcination of the dried product required to release both the microporosity (water) and the mesoporosity by removing the structuring agent is performed with the following temperature profile: 30 minutes of rise to 200° C., then 1 hour at a steady stage of 200° C., then 3 hours of rise to 550° C., and finally 1.5 hours of steady stage at 550° C.

COMPARATIVE EXAMPLE 2

Synthesis of Zeolite Crystals without Addition of Nucleating Agent, and with TPOAC/Al$_2$O$_3$=0.08

The process is performed as described in comparative Example 1, the TPOAC/Al$_2$O$_3$ mole ratio being increased to 0.08.

Comparison of the Characteristics of the Hierarchically Porous Zeolite Powders Synthesized in Comparative Examples 1 and 2 with Zeolites of Examples 1, 2 and 3

The results of the characterizations of the hierarchically porous zeolites are collated in Table 1 below:

TABLE 1

| | Synthesis | | Nitrogen adsorption isotherm at 77 K | | | | XRD | SEM | TEM |
|---|---|---|---|---|---|---|---|---|---|
| Reference | TPOAC/ Al$_2$O$_3$ | Synthesis time (h) | Vµp (cm$^3$/g) | mesop. outer S (m$^2 \cdot$ g$^{-1}$) | mesop. outer S/ Vµp | Mesopore size distribution (nm) | spectrum Crystal phases | Crystal size (µm) | Mesopore size (nm) |
| Reference zeolite X | 0 | 20 | 0.342 | 35 | 102 | / | Pure X | 1.5 | None |
| Example 1 | 0.04 | 24 | 0.335 | 105 | 313 | 5 to 10 | Pure X | 1 to 3 | 5 to 10 |
| Example 2 | 0.02 | 24 | 0.339 | 85 | 250 | 5 to 10 | Pure X | 0.5 to 1 | / |
| Example 3 | 0.08 | 48 | 0.330 | 160 | 500 | 5 to 10 | Pure X | 4 to 8 | / |
| Comparative Example 1 | 0.04 | 96 | 0.260 | 90 | 346 | 5 to 10 | X + P | 4 to 8 | / |
| Comparative Example 2 | 0.08 | 96 | 0.040 | 103 | 2575 | 4 to 30 | P | / | / |

Key:
SEM: Scanning electron microscopy
TEM: Transmission electron microscopy
Reference: zeolite X Siliporite ® G5 AP from CECA
Vµp: micropore volume calculated with the Dubinin-Raduskevitch equation
mesop. outer S: mesopore outer surface area deduced from the t-plot extrapolation.

The results presented in Table 1 above show that the morphology of the crystals varies with the TPOAC content. An explanation is the effect of the structuring agent on the growth rates of the various crystal faces.

Figure 3:
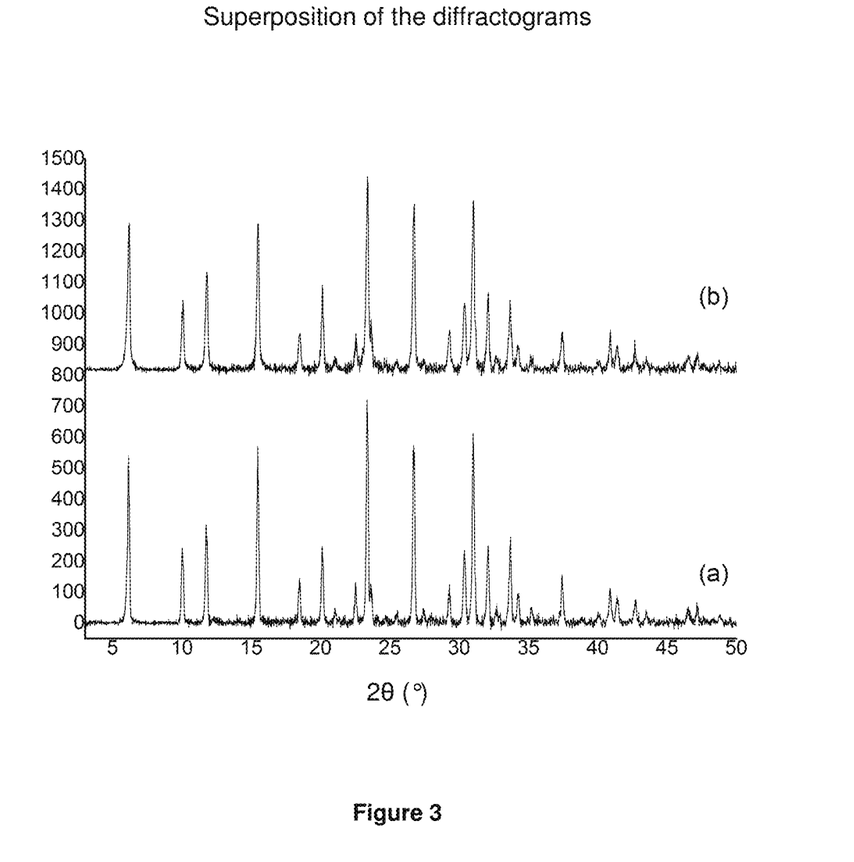
FIG. 3 shows the superposition of the diffraction spectra of the zeolites, as further explained in Example 4.

FIG. 3 shows the superposition of the diffraction spectra (diffractograms). The superposition of the X-ray diffraction spectra (diffractograms) shows that the diffraction peak intensities obtained with the solids according to the invention (zeolite of Example 1), referenced (b) in FIG. 3), are similar to those obtained with the reference zeolite (referenced (a) in FIG. 3), irrespective of the amount of structuring agent introduced. The process according to the invention thus makes it possible to obtain solids whose crystallinity is optimal and controlled.

The synthetic process performed with the use of a structuring agent, a seeding gel and/or a nucleating gel makes it possible to vary the micropore volume/mesopore outer surface area distribution in the case of zeolites with a low Si/Al ratio, typically between 1 and 1.4, while at the same time obtaining a zeolite of pure FAU (Faujasite) type, without observing any other crystal form, and in particular without co-crystallization of zeolite P.

EXAMPLE 5

Synthesis of HPX with Addition of Nucleating Gel and of Growth Gel with a TPOAC/$Al_2O_3$ Ratio=0.04

The process is performed as described in Example 1, with addition of 10% by weight of the same nucleating gel relative to the weight of the growth gel so as to reduce the size of the crystals.

The zeolite obtained has a crystal size of between 0.5 and 1.0 μm, i.e. the size of the zeolite crystals obtained in Example 1.

EXAMPLE 6

Synthesis of LSHPX with Addition of Nucleating Gel and of Growth Gel with a TPOAC/$Al_2O_3$ ratio=0.04 a) Preparation of the Growth Gel: Reactor Stirred with an Archimedean Screw at 250 rpm A growth gel is prepared in a 3 liter stainless-steel reactor equipped with a heating jacket, a temperature probe and a stirrer, by mixing an aluminate solution containing 300 g of sodium hydroxide (NaOH), 264 g of 85% potassium hydroxide, 169 g of alumina trihydrate ($Al_2O_3$, $3H_2O$, containing 65.2% by weight of $Al_2O_3$) and 1200 g of water at 25° C. over 5 minutes with a stirring speed of 250 rpm with a silicate solution containing 490 g of sodium silicate, 29.4 g of NaOH and 470 g of water at 25° C.

The stoichiometry of the growth gel is as follows: 4.32 $Na_2O$/1.85 $K_2O$/$Al_2O_3$/2.0 $SiO_2$/114 $H_2O$. The homogenization of the growth gel is performed with stirring at 250 rpm for 15 minutes, at 25° C.

b) Addition of the Nucleating Gel 5.8 g of nucleating gel (i.e. 0.2% by weight) of composition 12 $Na_2O$/$Al_2O_3$/10 $SiO_2$/180 $H_2O$ prepared in the same manner as the growth gel, and which has been matured for one hour at 40° C., is added to the growth gel at 25° C. with stirring at 300 rpm. After 5 minutes of homogenization at 250 rpm, the stirring speed is reduced to 50 rpm and stirring is continued for 30 minutes.

c) Introduction of the Structuring Agent into the Reaction Medium 35.7 g of TPOAC solution at 60% in methanol (MeOH) are placed in the reaction medium with a stirring speed of 250 rpm for 5 minutes (TPOAC/$Al_2O_3$ mole ratio=0.04). Next, a maturation step is performed at 30° C. for 20 hours at 50 rpm before starting the crystallization.

d) Crystallization in Two Steps

The stirring speed is maintained at 50 rpm and an increase in the nominal temperature of the reactor jacket is then programmed to 63° C. linearly so that the temperature of the reaction medium rises to 60° C. over 5 hours, followed by a steady stage of 21 hours at 60° C.; the nominal temperature of the reactor jacket is then set at 102° C. so that the reaction medium rises in temperature to 95° C. over 60 minutes. After a steady stage of 3 hours at 95° C., the reaction medium is cooled by circulating cold water in the jacket to stop the crystallization.

e) Filtration/Washing

The solids are recovered on a sinter and then washed with deonized water to neutral pH.

f) Drying/Calcination

In order to characterize the product, drying is performed in an oven at 90° C. for 8 hours.

The calcination of the dried product which is necessary to release both the microporosity (water) and the mesoporosity by removing the structuring agent is performed by degassing under vacuum with a gradual increase in increments of 50° C. up to 400° C. over a period of between 9 hours and 16 hours, under vacuum (P<6.7×$10^{-4}$ Pa).

The results of the characterizations of this hierarchically porous zeolite are:

Dubinin-Raduskevitch micropore V=0.278 $cm^3·g^{-1}$
mesop. outer S=97 $m^2·g^{-1}$
Mesopore diameters DFT=5 nm to 10 nm.
XR diffractogram: pure Faujasite structure, no zeolite LTA detected.
Crystal size: 8 μm
The Si/Al mole ratio of LSHPX determined by X-ray fluorescence is equal to 1.01.

EXAMPLE 7

Synthesis of Zeolite HPA with Addition of Nucleating Gel and of Growth Gel with a TPOAC/$Al_2O_3$ Ratio=0.04 a) Preparation of the Growth Gel

A growth gel is prepared in a 1.5 liter glass reactor stirred with a three-paddle impeller at 600 rpm equipped with a heating jacket and a temperature probe, by mixing an aluminate solution containing 151 g of sodium hydroxide (NaOH), 112.4 g of alumina trihydrate ($Al_2O_3$.$3H_2O$, containing 65.2% by weight of $Al_2O_3$) and 212 g of water at 35° C. over 5 minutes with a stirring speed of 600 rpm with a silicate solution containing 321.4 g of sodium silicate and 325 g of water at 35° C.

The stoichiometry of the growth gel is as follows: 3.13 $Na_2O$/$Al_2O_3$/1.92 $SiO_2$/$68H_2O$. The homogenization of the growth gel is performed with stirring at 600 rpm, for 15 minutes at 35° C.

b) Addition of the Nucleating Gel 11.2 g of nucleating gel (i.e. 1% by weight) of composition 2.05 $Na_2O$/$Al_2O_3$/$1.92SiO_2$/$87H_2O$ prepared in the same manner as the growth gel, and which has been matured for two hours at 25° C., are added to the growth gel, at 35° C. with stirring at 300 rpm. After 5 minutes of homogenization at 300 rpm, the stirring speed is reduced to 190 rpm and stirring is continued for 30 minutes.

c) Introduction of the Structuring Agent into the Reaction Medium 35.7 g of TPOAC solution at 60% in methanol (MeOH) are introduced into the reaction medium with a stirring speed of 600 rpm (TPOAC/$Al_2O_3$ mole ratio=0.04). A maturation step is performed at 35° C. for 10 minutes at 300 rpm before starting the crystallization.

d) Crystallization

The stirring speed is lowered to 190 rpm and the nominal temperature of the reactor jacket is set at 105° C. so that the temperature of the reaction medium rises to 97° C. over 40 minutes. After a steady stage of 3 hours at 97° C., the reaction medium is cooled by circulating cold water in the jacket to stop the crystallization.

e) Filtration/Washing

The solids are recovered on a sinter and then washed with deionized water to neutral pH.

f) Drying

Drying is performed in an oven at 90° C. for 8 hours to obtain a solid with a loss on ignition of 20%.

g) Calcium Exchange

In order to characterize the porosity of the zeolite HPA, a calcium exchange is performed to obtain a micropore diameter of about 0.5 nm: 50 g of dried powder are placed in contact with 500 cm$^3$ of a 0.5 M CaCl$_2$ solution at 70° C. for 2 hours, and are then filtered off and washed with 280 ml of water. The operation is repeated three times (triple exchange).

h) Drying

Drying is performed in an oven at 90° C. for 8 hours to obtain a solid with a loss on ignition of 20%.

i) Calcination

The calcination of the dried product that is necessary to release both the microporosity (water) and the mesoporosity by removing the structuring agent is performed by degassing under vacuum with a gradual rise in increments of 50° C. up to 400° C. over a period of between 9 hours and 16 hours, under vacuum (P<6.7×10$^4$ Pa).

The results of the characterizations of this CaHPA hierarchically porous zeolite are as follows:

Dubinin-Raduskevitch micropore V=0.265 cm$^3 \cdot$g$^{-1}$
mesop. outer S=102 m$^2 \cdot$g$^{-1}$
Mesopore diameter DFT=5 nm to 10 nm.
XR diffractogram: pure zeolite LTA structure.
Crystal size: 0.8 μm.
The Si/Al mole ratio of the HPA determined by X-ray fluorescence is equal to 1.02.

The process described in the present invention is economically viable, simple to perform industrially, with a very substantial saving in time when compared with the syntheses described in the prior art. In addition, the synthetic process of the invention makes it possible to achieve entirely satisfactory yields, with, for example, an optimal yield of 99% relative to the amount of aluminium engaged, which is the element in deficit in the synthesis gel.

The invention claimed is:

1. A process for preparing a hierarchically porous zeolite in the form of crystals having at least the following characteristics:
   Si/Al mole ratio of between 1 and 1.4, limits inclusive,
   a numerical mean diameter of the crystals of between 0.1 μm and 20 μm, limits inclusive,
   controlled and optimal crystallinity, and
   mesoporosity such that the mesoporous outer surface area is between 40 m$^2 \cdot$g$^{-1}$ and 400 m$^2 \cdot$g$^{-1}$ the process comprising at least the following steps:
   a) preparing a growth gel for synthesizing a zeolite selected from the group consisting of FAU zeolite X, FAU zeolite MSX, FAU zeolite LSX, EMT zeolite; and LTA zeolite, by mixing a source of silica with a source of Al$_2$O$_3$, at a temperature of between 0° C. and 60° C.,
   b) adding to the growth gel of step a) a nucleating agent, at a temperature of between 0° C. and 60° C., wherein the growth gel and the nucleating agent together comprise a reaction medium,
   c) adding to the reaction medium at least one structuring agent,
   d) carrying out a crystallization reaction by increasing the temperature to achieve the crystallization reaction and obtain zeolite crystals,
   e) filtering and washing the zeolite crystals obtained, and
   f) drying and calcining.

2. The process according to claim 1, in which the nucleating agent is a nucleating gel.

3. The process according to claim 2, wherein the amount of nucleating gel added is between 0.1% and 20%, limits inclusive, relative to the weight of the growth gel.

4. The process according to claim 2, wherein the amount of nucleating gel added is between 0.5% and 15% by weight, relative to the weight of the growth gel.

5. The process according to claim 1, wherein the nucleating agent is a crystal.

6. The process according to claim 5, wherein the amount of crystal added is between 0.1% and 10% by weight relative to the total weight of growth gel.

7. The process according to claim 1, wherein the source of silica is sodium silicate and the source of Al$_2$O$_3$ is alumina trihydrate.

8. The process according to claim 1, wherein the structuring agent is an organosilane.

9. The process according to claim 1, wherein the structuring agent is selected from the group consisting of [3-(trimethoxysilyl)propyl]-octadecyldimethylammonium chloride, [3-(trimethoxysilyl)propyl]hexadecyl-dimethyl-ammonium chloride, [3-(trinnethoxysilyl)propyl]dodecyldimethylammonium chloride, [3-(trimethoxysilyl)propyl]octylammonium chloride, N-[3-(trimethoxysilyl)-propyl]aniline, 3-[2-(2-aminoethylamino)ethylamino]propyltrimethoxysilane, N-[3-(trimethoxysilyl)propyl]-N'-(4-vinylbenzyl)ethylenediamine, triethoxy-3-(2-imidazolin-1-yl)propylsilane, 1-[3-(trimethoxysilyl)propyl]urea, N-[3-(trimethoxysilyl)propyl]ethylene-diamine, [3-(diethylamino)propyl]trimethoxysilane, (3-glycidyloxypropyl)trimethoxysilane, 3-(trimethoxysilyl) propyl methacrylate, [2-(cyclohexenyl)ethyl]triethoxysilane, dodecyltriethoxysilane, hexadecyltrimethoxysilane, (3-aminopropyl)trimethoxysilane, (3-mercaptopropyl)trimethoxysilane, (3-chloropropyl)trimethoxysilane, and also mixtures of two or more thereof in all proportions.

10. The process according to claim 1, wherein the amount of structuring agent(s) in step c) and the amount of Al$_2$O$_3$ in step a) is such that the structuring agent(s)/ Al$_2$O$_3$ mole ratio is between 0.005 and 0.20, limits inclusive.

11. The process according to claim 1, wherein the amount of structuring agent(s) is such that the structuring agent(s)/ starting Al$_2$O$_3$ mole ratio is between 0.01 and 0.15, limits inclusive.

* * * * *